United States Patent [19]

Kesselman

[11] 4,215,600
[45] Aug. 5, 1980

[54] TORQUE LIMITER FOR USE WITH OFF-THE-SHELF FASTENING ELEMENTS

[76] Inventor: David A. Kesselman, P.O. Box 299, Sonoma, Calif. 95476

[21] Appl. No.: 950,687

[22] Filed: Oct. 12, 1978

[51] Int. Cl.² .......................................... B25D 23/142
[52] U.S. Cl. ................................................. 81/52.4 R
[58] Field of Search ................. 81/52.4 R, 52.4 A, 64, 81/121, 122, 123; 85/61; 151/52; 64/28, 30 D, 30 E

[56] References Cited

U.S. PATENT DOCUMENTS

| 845,717 | 2/1907 | Miller | 81/121 R |
|---|---|---|---|
| 1,092,574 | 4/1914 | Jansson | 81/52.4 R |
| 2,701,491 | 2/1955 | Ross | 81/64 |
| 2,743,640 | 5/1956 | Verkuil | 81/64 |
| 3,331,267 | 7/1967 | Tietge | 81/121 R |
| 3,837,244 | 9/1974 | Schera | 81/64 |

FOREIGN PATENT DOCUMENTS 854792  11/1960  United Kingdom ................. 81/52.4 R Primary Examiner—James L. Jones, Jr.
Attorney, Agent, or Firm—Shoemaker and Mattare

[57] ABSTRACT

A torque limiter for limiting the amount of torque applied to off-the-shelf fastening members which are not themselves inherently torque limiting. The torque limiter is separate from the fastening member and is applied thereto to grippingly engage that fastening member. The torque limiter undergoes tension induced breakage upon application of a predetermined torque thereto. The tension induced breakage frees the torque limiter from gripping engagement with the fastening element to thereby prevent further torque application to the fastening member via the torque limiter.

2 Claims, 14 Drawing Figures

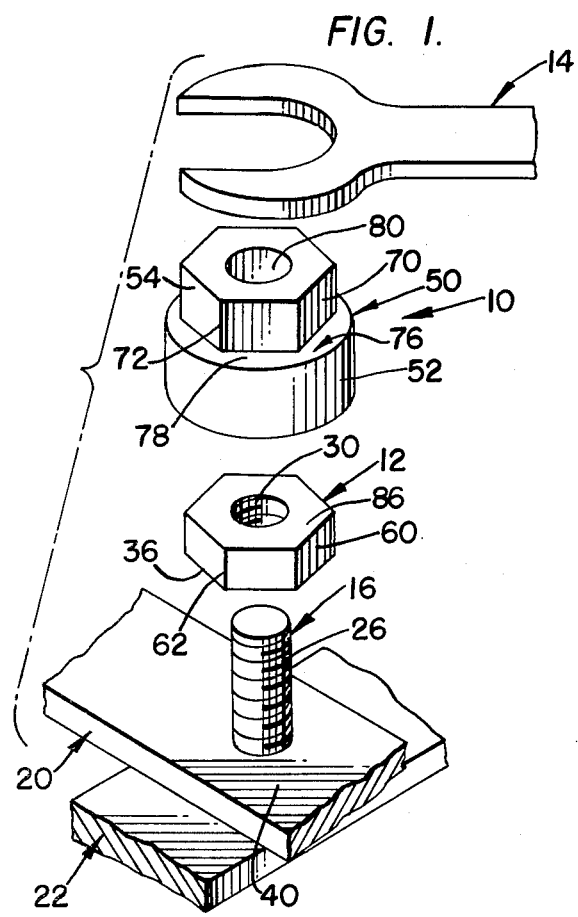
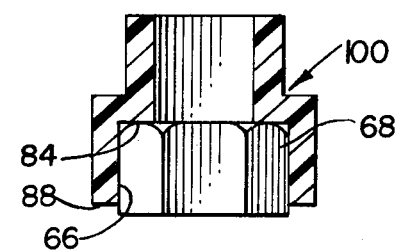
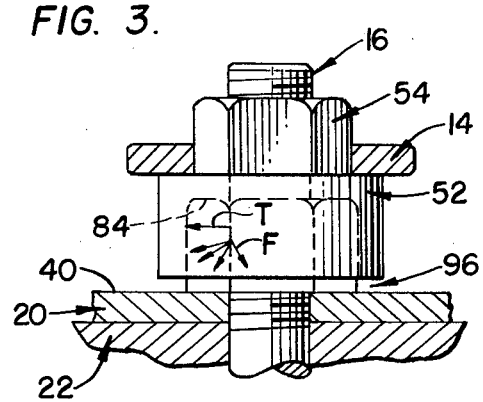
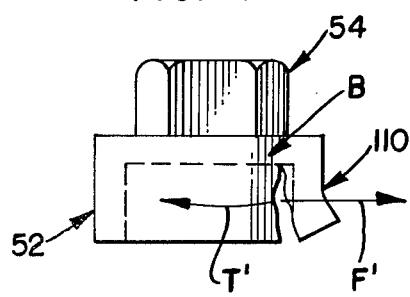
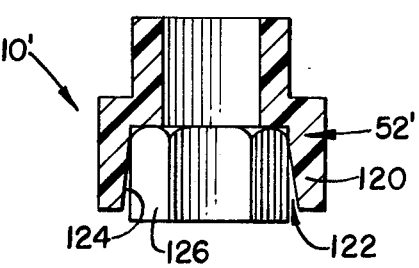
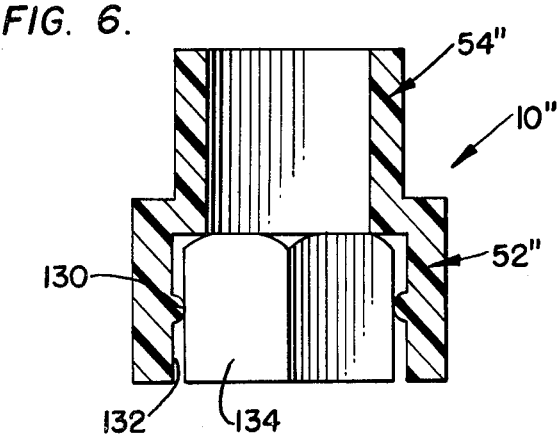
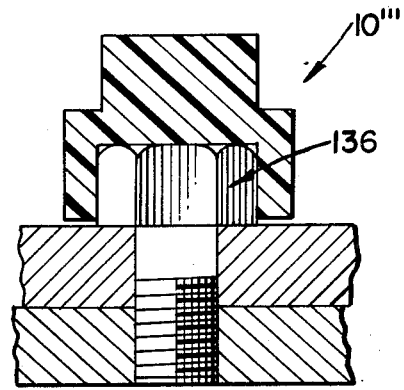

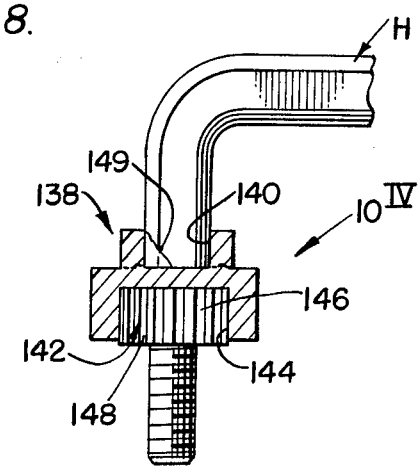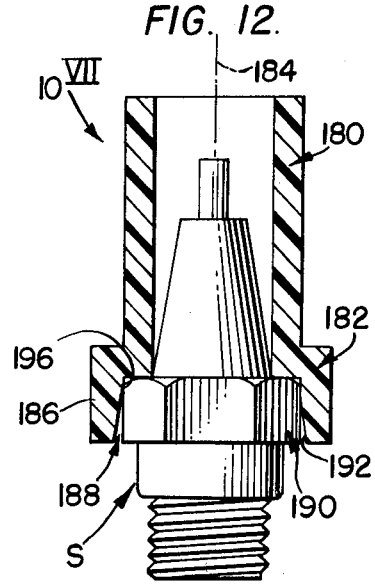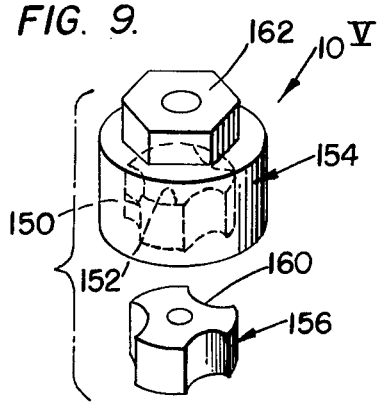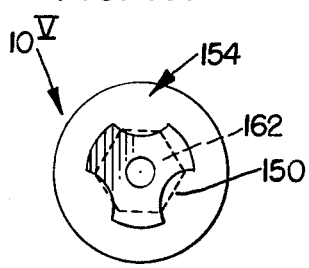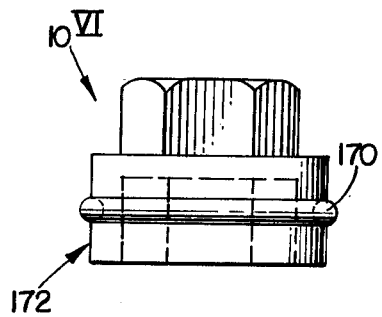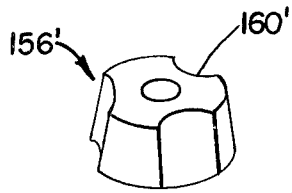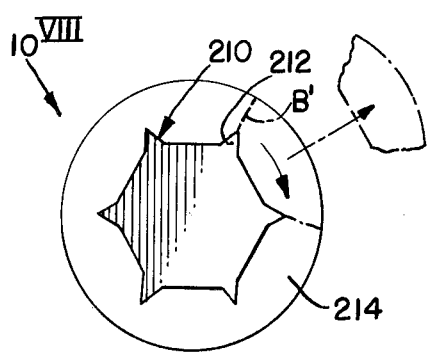

TORQUE LIMITER FOR USE WITH OFF-THE-SHELF FASTENING ELEMENTS

BACKGROUND OF THE INVENTION

The present invention relates in general to fastening elements, and, more particularly, to elements used to control the amount of torque applied to fastening elements.

In many applications of threaded fastening devices, the value of torque applied thereto is critical. The application of too little torque results in accidental loosening of the fastening device, while excessive tightening may cause damage to the fastening device or adjacent parts. In most applications, it is impossible to visibly determine whether or not the appropriate torque has been applied to an in-place threaded fastening.

As the off-the-shelf fastener is not, itself, torque limiting, the difficulty in visually determining whether the proper amount of torque has been applied to a fastener has engendered disclosure of devices which are useful in controlling the amount of torque applied to such fasteners. Examples of such devices are torque wrenches and torque measuring devices. While useful, these tools and systems are expensive and often cumbersome. Additionally, the use of torque wrenches depends upon individual initiative and, therefore, it is difficult to assure the torque wrench has been properly used, if at all.

Other torque controlling devices known to the inventor include torque control means integral with the fastening device (see U.S. Pat. No. 4,037,515, issued to D. A. Kesselman on July 26, 1977). These systems usually provide for a severable, weakened extension of the fastening device, itself, which is designed to fail at a predetermined torque value. While these systems are somewhat effective, they are expensive, requiring use of the expensive materials from which the fastening member itself is constructed, and additionally, requiring special machining or forming operations. Also, because of the special designs required, this class of system precludes the use of standard, off-the-shelf fastening means.

As used herein, the term "off-the-shelf" is taken to mean those items commonly and presently available. Such items as screws, bolts, and the like, which are readily purchased in normal commercial distribution outlets, such as hardware stores, drugstores, and the like, are "off-the-shelf" items within the meaning attached to that term in the present disclosure, as opposed to items which must be purchased in specialty stores, or ordered specially.

Other devices known to the inventor include those devices disclosed in U.S. Pat. Nos. 3,460,428, 3,929,054 and 4,068,555. However, all of the devices disclosed in these just-mentioned patents require special torque limiting fasteners to function as a torque limiter. These special fasteners serve as the fastening element, and thus replace the off-the-shelf fastener. Thus, these devices are not themselves typical off-the-shelf items, and are not amenable for use with off-the-shelf hardware, and therefore must be specially purchased and used. The problems and drawbacks to such limitations include cost and availability, as well as the difficulties caused the person using the device.

A clamp tightener is disclosed in U.S. Pat. No. 2,503,189, issued to E. Biba, Jr. on Apr. 4, 1950, and includes a spring clamped over a non-circular post of a fastener. The spring is accommodated within a chamber of a cap member, and when torque exceeds a predetermined value, the spring simply overrides the edges of the non-circular post. While such a device is somewhat effective, it has several drawbacks, such as, for example, the non-uniformity caused by relying on the holding force exerted by a spring under various conditions, the possibility of exerting too little torque due to a loosened condition for the spring, and the like. The Biba device may be satisfactory for hose clamps and other finger tightened type devices, but may not be reliable to achieve accurate and high enough torque values or otherwise be suitable for applications involving wrenches, screwdrivers, or other such torquing elements.

Accordingly, there is need for a torque limiter which can be used in conjunction with off-the-shelf fasteners which are not themselves torque limiting for limiting the amount of torque applied to such off-the-shelf fasteners.

SUMMARY OF THE INVENTION

The device embodying the teachings of the present invention is amenable for use with off-the-shelf fasteners, such as nuts, bolts, and the like for limiting the amount of torque applied to such devices which are, themselves, not inherently torque limiting.

The device of the present disclosure includes a unitary body having upper and lower sections which are non-separably joined together. The lower section has an internal bore defined therein to be longitudinal of the body, and the inner surface of that lower section which defines the bore is shaped to grippingly accommodate an off-the-shelf fastener.

The unitary, non-separable nature of the torque limiter embodying the teachings of the present invention has a tension induced failure in the lower section upon application of a predetermined torque to the upper section. The tension induced failure arises at the points of engagement between the fastener and the torque limiter lower section. The torque applied to the upper section of the limiter induces one force which is directed circumferentially of the lower section wall in a first direction which force is opposed by the forces generated by the resistance to turning the fastener which are directed outwardly of the lower section wall. Thus, a wedge effect is created, and, as torque is applied to the torque limiter, two forces are generated, one being circumferential and the other being outward. The opposing forces rise as the fastener is tightened and torque application is continued. The opposed forces therefore generate stress on the material at the fastener gripping areas which pull the material at those areas thus tending to cause extension. The pull of forces is resisted by the material, as is usual in tension stress situations. At a predetermined value of torque, the tension in the lower section at the fastener gripping positions rises to a value in excess of the tension fracture limit of the material, and the lower section wall ruptures along the line which is directed generally longitudinally of the torque limiter which rupture causes the torque limiter to release the gripping engagement of the fastener. Thus, tension failure is caused by the wedge effect of the fastener and the means used to drive the torque limiter. Part of the torque limiter dissociates from the fastener, and the remaining part overruns the fastener to prevent further application of torque thereto via the torque limiter.

The tension induced failure of the presently disclosed torque limiter is opposed to the shear induced failure of known torque limiters. Thus, the rupture line of the wall in the presently disclosed torque limiter is oriented essentially longitudinally of the torque limiter, as opposed to a line located within a plane oriented essentially perpendicular with respect to the longitudinal direction on the torque limiter as will occur in those torque limiter controlling devices wherein shear forces are used to fracture a frangible neck or other such element (see, e.g., the Kesselman Patent). Thus, tension induced failure is utilized in the device of the present invention as opposed to shear-induced failure used in the devices embodying the teachings of the prior art.

Thus, using the device of the present disclosure, off-the-shelf fasteners can be used and the amount of torque applied thereto can be closely controlled and limited. Such off-the-shelf fasteners are therefore capable of being tightened sufficiently to prevent loosening, but not tightly enough to raise a possibility of damage, deformation, or failure. Special fasteners are not required, and thus costs and the like are reduced from the prior art torque limiters which replace the off-the-shelf type fasteners with special torque limiting fasteners. The presently disclosed device does not include a fastener, but is used in conjunction with a fastener, or fastening element.

Due to the reliance thereof on tension failure to limit the amount of torque applied to a fastener, the torque limiter of the present disclosure can be manufactured to very close tolerances, and the amount of maximum torque applied to a fastener via the torque limiter can thus be precisely controlled, and will be within close limits for a wide range of conditions and applications. The tension failure operation depends upon material properties and mechanics of materials which are not affected to any great degree by unusual external conditions. Even unusual external conditions, such as high temperature, or the like, can be accounted for during the manufacturing stage.

For example, special high heat resistant polystyrene offers a tension value of 6,500 to 12,000 psi; however, by the addition of glass fibers, the tension values increase to 9,000 to 15,000 psi. Thus by adjusting the material and/or the filler, the torque values can be readily adjusted for specific environmental conditions.

OBJECTS OF THE INVENTION

It is, therefore, a main object of the present invention to limit the amount of torque applied to off-the-shelf fasteners.

It is another object of the present invention to provide a device which does not itself include a fastener, but produces a fastened element having a predetermined amount of torque applied thereto.

It is a further object of the present invention to provide a device usable in conjunction with off-the-shelf fastening elements to limit the amount of torque applied thereto during a tightening process.

It is yet another object of the present invention to provide a torque limiter which is reliable and produces uniform limits for a wide range of conditions.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is an exploded perspective view of a torque limiter embodying the teachings of the present invention.

FIG. 2 is a cutaway elevation view of the FIG. 1 torque limiter.

FIG. 3 is an assembled view of the FIG. 1 torque limiter.

FIG. 4 is an elevation view of the FIG. 1 torque limiter after tension induced failure thereof.

FIG. 5 is an elevation view of an alternative embodiment of a torque limiter embodying the teachings of the present invention.

FIG. 6 is an elevation view of another embodiment of a torque limiter embodying the teachings of the present invention.

FIG. 7 is an elevation view of another embodiment of a torque limiter embodying the teachings of the present invention.

FIG. 8 is an elevation view of another embodiment of the torque limiter embodying the teachings of the present invention.

FIG. 9 is a perspective view of another embodiment of a torque limiter embodying the teachings of the present invention.

FIG. 10 is a bottom view of the FIG. 9 torque limiter.

FIG. 11 is an elevation view of another embodiment of a torque limiter embodying the teachings of the present invention.

FIG. 12 is an elevation view of another embodiment of a torque limiter embodying the teachings of the present invention.

FIG. 13 is a plan view of another embodiment of a torque limiter embodying the teachings of the present invention.

FIG. 14 is a perspective view of a cone shaped fastener which can be used in conjunction with the torque limiter shown in FIG. 13.

DETAILED DESCRIPTION OF THE INVENTION

Shown in FIG. 1 is a torque limiter 10 for limiting the amount of torque applied to fastener 12 by a torque exerting member, such as crescent wrench 14. The fastener 12 is an off-the-shelf type fastener, such as a nut, bolt, or the like such as can be purchased in hardware stores, drugstores, discount stores, and the like. The fastener 12 is applied to a threaded stud 16 which is inserted through a pair of elements 20 and 22 which are to be held together by the stud-fastener configuration. The stud shown in FIG. 1 is also an off-the-shelf type element and includes a shank having external threads 26 defined thereon for cooperable association with internal threads 30 defined on a bore defining surface of the fastener. As is usual in such off-the-shelf type combinations, the fastener is threaded onto the stud until lower surface 36 thereof contacts upper surface 40 of the topmost element 20, and then torquing force on the fastener is continued until there is a desired amount of pressure exerted by the stud-fastener combination on the elements.

As discussed above, continued torquing of the fastener after contact occurs between that fastener and element 20 may damage that fastener or strip the cooperating threads, or damage the elements, or the like. As also discussed above, insufficient pressure on the elements from the stud-fastener combination is also undesirable.

The torque limiter 10 regulates and limits the amount of torque which can be applied to such off-the-shelf fasteners, and thus, during the final tightening phase of the operation, the desired amount of torque can be applied to the fastener in a closely controlled manner regardless of the conditions to which the fastener and torque limiter are subject. The torque limiter 10 is shown in FIG. 1 to include a unitary body 50 having a tubular fastener accommodating and engaging lower section 52 and a torquing member engageable upper section 54 integrally and non-separably mounted on that lower section.

As shown in FIG. 1, the fastener 12 has a polygonal outer perimeter with a plurality of facets 60 thereon joined at edges 62. As shown in FIG. 2, the torque limiter lower section 54 has a hollow bore 66 which has a perimeter shaped to accommodate and correspond to the shape of the fastener outer perimeter. Thus, the bore 66 has flat areas joined together at the edges thereof to define fastener edge receiving areas 68. The lower section thus is shaped to encase the fastener in a manner which prevents relative rotation between the torque limiter 10 and the fastener so that rotation of the torque limiter will transmit rotation inducing force to the fastener in direct proportions.

The upper section 52 is shown in FIG. 1 to have a polygonal outer perimeter which includes a plurality of facets 70 joined at the edges 72 thereof and is adapted to be engaged by a torquing member. As shown in FIG. 1, the preferred embodiment of the torque limiter includes an upper member having an outer perimeter which corresponds in shape and size to the fastener outer perimeter. However, there are embodiments of the invention in which the upper member is of either larger or smaller circumference than the fastener outer perimeter. Such embodiments may have particular application in specific uses of the invention. For example, when the circumference of the upper member is different than that of the fastener there is no likelihood that the same wrench used for applying torque to said upper section can accidentally be used to apply additional torque to the fastener after removal of the torque limiter. The lower section 54 has a larger outer diameter than the upper section, and hence a shoulder 76 is defined by the upper surface 78 of the lower section. The torquing member can rest on the shoulder 76 during the torquing operation. As shown in FIGS. 1 and 2, the upper section 52 is hollow and has a bore 80 defined therethrough to have a longitudinal centerline colinear with a longitudinal centerline of the lower section. The bore 80 of the upper section has a diameter smaller than the diameter of the bore 66, and hence an internal shoulder 84 is defined at the interface between these two bores. Top surface 86 of the fastener abuts the shoulder 84 to ensure a stable seating of the torque limiter on the fastener.

As shown in FIG. 3, the stud 16 extends out of the top of the torque limiter, and the height of the tubular lower section as measured between the shoulder 84 and lower rim 88 is less than the height of the fastener as measured between the top surface 86 thereof and the lower surface 36 thereof so that a gap 96 is defined between the lower rim 88 and the upper surface 40 of the topmost element 20.

The upper and lower sections of the torque limiter are coupled together at a location indicated by the reference numeral 100 in the Figures. It is here noted that location 100 is not a junction, but merely a location whereat a discontinuity in outer perimeter occurs in the torque limiter. The torque limiter is a single unitary element having portions thereof which are herein denoted as upper and lower sections for the sake of description. The upper and lower sections of the torque limiter are not intended to be separable from each other and all of the torque applied to one of those sections will be transmitted to the other section in an unabated and non-attenuated manner during the entire operation of the limiter. It is for this reason the term "location" is used in contrast to a term such as "junction" or the like which implies a weakened area, which is not intended for the torque limiter 10.

The fastener 12 can be threadably coupled onto the stud 16 until that fastener loosely engages the upper surface 40, as by hand tightening or the like. After such loose engagement, further torquing of the fastener will tighten that fastener down onto the elements 20 and 22. The continued torquing at this point is subject to the above-discussed restraints, and the torque limiter 10 serves to limit the amount of torque applied to the fastener by the torquing member. The fastener can be loosely tightened with or without the torque limiter in place thereon as suitable. The edge receiving areas 68 of the lower section engage the edges 62 of the fastener, and thus torque is transmitted to the fastener at the edges 62 by the areas 68. Correspondingly, force is exerted on the torque limiter at the areas 68 by the fastener as a result of resistance to turning. Considering an individual one of the edge receiving areas, it is seen that the torquing force is exerted circumferentially of the lower section as indicated by the arrow T in FIG. 3, and a force arises within the lower section wall and is exerted outwardly on the lower section wall by the fastener in a direction indicated by arrow F in FIG. 3. The opposing nature of the two forces sets up a tension inducing force component within the lower section at the edge receiving areas. The two forces induce tension in the torque limiter lower section by a wedge effect. The opposed nature of the circumferential and outward forces cause tension failure of the torque limiter. The circumferential force is indicated in FIG. 4 as T' and the outward force is indicated in FIG. 4 as F', and these two forces produce a tension failure to produce the fragment 110 which moves outwardly from the lower portion as shown in FIG. 4.

The properties, such as thickness, fracture modulus, profile, and the like, of the material forming the lower section 52 are selected so that a predetermined tension therein will cause a break in the material. As indicated in FIG. 4, this break will be along a breakline B which extends longitudinally of the lower section from the top 78 thereof to the bottom rim 88 thereof. As shown in FIG. 4, a segment, such as segment 110, is connected to the upper section 54 but is dissociated from the lower section, thereby causing the lower section to be released from engagement with the fastener due to the release of that edge associated with the edge receiving areas at which the separation occurs, and due to the release of the other fastener edges caused by the relaxation of the lower section which results from the break therein. As shown in FIG. 4, with the exception of the segment 110, which remains attached to the upper portion 54, the torque limiter 10 remains intact and engaged with the torquing device and engaged on the fastener. This intact feature reduces the possibility that broken parts of the torque limiter will fall into adjacent assemblies. The remaining edge receiving areas 68 on the torque limiter will simply overrun the edges of the fastener.

It is noted that the torque limiter disclosed herein is adapted for use with common, off-the-shelf fasteners which are not inherently torque limiting. Without torque limitation, such off-the-shelf fasteners can be tightened beyond the elastic limits thereof, and damage, and even failure, can occur. The torque limiter embodying the teachings of the present invention is adapted to be used with such common fasteners as nuts, screws, and the like.

Various modifications of the torque limiter are shown in the remaining Figures. Thus, FIG. 5 shows a torque limiter 10' having a lower section 52' which includes walls 120. The walls are sloped radially outward of the lower section to define an outwardly converging gap 122 between the inner wall surface 124 and outer surface 126 of the fastener side wall. An inwardly protruding bead or rib 130 can be positioned on wall inner surface 132 of lower section 52' of a torque limiter 10'' as shown in FIG. 6 to contact the fastener wall outer surface 134. As shown in FIG. 7, a torque limiter 10''' has a lower section adapted to contact a bolthead 136, or the like. As shown in FIG. 7, the torque limiter 10''' has a solid upper section 54''' as the bolt will not extend through that torque limiter.

FIG. 8 shows a torque limiter $10^{IV}$ adapted to accommodate a socket wrench H. The torque limiter $10^{IV}$ includes a body section 138 having a recess 140 defined therein to accommodate the torque wrench H, where, preferably, is an Allen wrench. The body section 138 includes flat areas joined at corners to receive the corners of the wrench H. As shown, the body section engages facets or recesses in a fastener such as a machine bolt 142 to fail in tension as above discussed wth regard to the previous embodiments. The body thus has a recess 144 having a plurality of slots, or the like, which engage corresponding slots 146 on the head 148 of the machine bolt 142. In this case, the wedging action produces a tension failure in the body section 138 as indicated by the numeral 149 or in a plate adjacent the vertical side surfaces of the machine screw or bolt as in other embodiments.

FIGS. 9 and 10 show a torque limiter $10^V$ having a plurality of longitudinally directed keys 150 defined on inner surface 152 of lower section 154 thereof. The inner surface 152 is circular in cross-section, and a circular fastener 156 is accommodated therein. The fastener 156 has a plurality of shallow keyway slots 160 defined in the outer surface thereof to receive the keys 150 in locking relationship. The torque limiter $10^V$ also has an upper section 162. As torque is applied to the torque limiter $10^V$, the projections, or keys 150, will wedge outwardly thereby causing a tension failure. An alternative form of the torque limiter $10^V$ will accommodate a cone shaped fastener 156' shown in FIG. 14 to include keyway slots 160'.

A torque limiter $10^{VI}$ is shown in FIG. 11 as having a reinforcing member 170, such as an O-ring, tape, or the like, mounted around lower section 172 thereof. The torque limiter $10^{VI}$ can be used to limit the torque applied to fasteners used in environments in which extremely high torque values are required, for example, in shipbuilding or structural fasteners of S.A.E. Grade 8 or the like. The reinforcing member 170 not only can be sized to substantially increase the tension failure values of the lower section 172, but provides additional insurance against fragments completely separating from the limiter and contaminating adjacent parts of machinery or equipment.

A torque limiter $10^{VII}$ is shown in FIG. 12 and is adapted for use with a sparkplug S and includes an upper section 180 which is longer than lower section 182 as measured along the longitudinal centerline 184 of the torque limiter $10^{VII}$. A preferred form of the limiter $10^{VII}$ has a lower section wall 186 which is sloped radially outward from longitudinal centerline 184 to define a gap 188 between a gripping area 190 of the sparkplug and inner surface 192 of lower section bore 196. The sparkplug S gripping area may be hexagonal in peripheral configuration, and thus in accordance with the teachings of the present disclosure, the bore 196 is hexagonally shaped to correspond and grippingly accommodate the plug gripping area. The preferred form of the torque limiter $10^{VII}$ has a hexagonally spaced upper portion 180 in accordance with the above discussion. The limiter $10^{VII}$ operates in a manner similar to the above disclosed limiters, and therefore incurs a tension induced rupture in the longitudinal direction in the lower section wall to dissociate a fragment from that wall, and thereby release the gripping engagement between the torque limiter and the sparkplug S. Additionally, the upper portion 180 acts to provide protection to the fragile insulator section of the sparkplug S.

A further embodiment of the torque limiter is shown in FIG. 13 and is indicated by the reference numeral $10^{VIII}$. Limiter $10^{VIII}$ includes edge receiving areas 210 which form recesses 212 thereby reducing the thickness of the limiter lower section wall 214 at each of the edge receiving areas 210. The reduced wall thickness concentrates the tension induced forces at those areas thereby encouraging and further controlling the formation of a breakline, such as breakline B' shown in FIG. 14. The breakline B' is more uniform and in closer alignment with the longitudinal centerline of the limiter $10^{VIII}$ than the breakline B shown in FIG. 4 due to the reduced wall thickness adjacent the edge receiving areas 210 in the torque limiter $10^{VIII}$ as the breakline B' closely follows the straight receiving area 210. Otherwise, operation of the torque limiter $10^{VIII}$ is the same as the operation of the other torque limiters disclosed hereinabove.

Other types of fasteners can also be used in conjunction with the torque limiter embodying the teachings of the present disclosure. Thus, by suitably modifying the configuration of the torque limiter lower section just about any standard, readily available fastener can be torque limited using a torque limiter embodying the teachings of the present invention. Thus, for example (but not limited to): square nuts, hex slotted nuts, hex thick nuts, hex jam nuts, hex castle nuts, hex thick slotted nuts, high slotted nuts, hex flange nuts, and the like can be accommodated.

The torque limiter embodying the teachings of the present disclosure is amenable for use in conjunction with any type of torquing member, such as sockets, crescent wrenches, pliers, screwdrivers, or the like. The limiter is easily and cheaply manufactured and thus can be discarded after use without incurring undue costs. As above discussed, the preferred embodiments of the torque limiter have the upper section the same transverse cross-sectional size and transverse cross-sectional shape as the fastener, but other shapes and configurations can be used without departing from the scope of the present disclosure. For example, small sizes can be used to prevent use of a wrench or the like on an in-place threaded fastener.

As is evident from the above discussion, the torque limiter of the present disclosure is amenable for use with a wide variety of fasteners, torquing members, and the like having a wide range of sizes and configurations. Furthermore, fastener configurations can include (but are not limited to): square; hexagonal; slotted; indented; bent; flanged; twelve sided; and any special shapes which may be desirable.

The torque limiter embodying the teachings of the present invention may be manufactured of any suitable, formable material which will fracture and destruct upon application of a predetermined torque force. The preferred embodiment of the frangible material is plastic, however other suitable materials include (but are not limited to): polystyrene; thermal plastic resins; fiberglass; pot metal; and the like. Furthermore, compound materials can be used, and reinforcing means, such as stiffeners, hoops, or the like, can be positioned within the torque limiter wall or walls to further control the fracture point of the torque limiter.

The torque limiter embodying the teachings of the present invention can be manufactured in any suitable manner; however, injection molding is preferred due to the low cost and close tolerance control associated therewith. Other methods of manufacture can also include cold forming, and the like.

A preferred embodiment of the torque limiter of the present disclosure has the following physical characteristics:

| Material | Tension Failure Value | Nut Size | Drive Size | Wall Thickness | Torque |
|---|---|---|---|---|---|
| Thermoplastic polyester (ASTM-D-638) | 17–19,000 psi | ⅜" | 9/16" | 0.107–8" | 260 inch Lbs ±10% |
| " | | " | " | 0.077–8" | 200 inch Lbs ±10% |

Additionally, it may be possible to use a polystyrene glass-filled material and/or a nylon and glass mineral combination material with the presently disclosed torque limiter.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A torque limiter for limiting the amount of torque applicable to an off-the-shelf fastener comprising:

a frangible unitary body having an upper section and a lower section, said lower section having a longitudinal bore defined therein and having a constant wall thickness at any perimetric location thereon;

torquing element contacting means on said upper section for contacting a torquing member to transfer torque from such torquing member to said unitary body;

fastener gripping means on said lower section for gripping an off-the-shelf fastener which is distinct from the torque limiter and transferring torque from a torquing member to such fastener, the torquing force being resisted by a fastener resistance to turning so that a tension inducing force arises in said lower section, said fastener gripping means being longitudinally spaced from said torque element contacting means;

said lower section including a portion which breaks along a line directed generally longitudinally of said body lower section under said tension induced forces when such tension induced forces reach a predetermined and precisely controlled level to release said fastener gripping means from gripping engagement with a fastener when a precisely predetermined amount of torque is applied to an off-the-shelf fastener thereby limiting and defining the amount of torque applicable to an off-the-shelf fastener.

2. The torque limiter of claim 1 wherein said material includes a frangible plastic composition.

* * * * *